(12) United States Patent  
Sayama

(10) Patent No.: US 8,534,750 B2  
(45) Date of Patent: Sep. 17, 2013

(54) STOWABLE VEHICLE SEAT

(75) Inventor: Tatsuo Sayama, Tochigi (JP)

(73) Assignee: TS Tech Co., Ltd., Asaka-Shi (JP)

( * ) Notice: Subject to any disclaimer, the term of this patent is extended or adjusted under 35 U.S.C. 154(b) by 451 days.

(21) Appl. No.: 12/922,888

(22) PCT Filed: Mar. 24, 2009

(86) PCT No.: PCT/JP2009/055829
§ 371 (c)(1),
(2), (4) Date: Sep. 16, 2010

(87) PCT Pub. No.: WO2009/119586
PCT Pub. Date: Oct. 1, 2009

(65) Prior Publication Data
US 2011/0018323 A1    Jan. 27, 2011

(30) Foreign Application Priority Data

Mar. 24, 2008  (JP) ................................. 2008-076327

(51) Int. Cl.
*B60N 2/32*  (2006.01)
(52) U.S. Cl.
USPC ................... 297/15; 297/378.12; 297/378.14; 296/65.09
(58) Field of Classification Search
USPC ............... 297/378.1, 378.12, 15; 296/65.05, 296/65.09
See application file for complete search history.

(56) References Cited

U.S. PATENT DOCUMENTS

| 6,231,101 | B1 * | 5/2001 | Kamida et al. ................... 296/63 |
| 6,644,730 | B2 * | 11/2003 | Sugiura et al. .................. 297/15 |
| 6,773,068 | B2 * | 8/2004 | Shinozaki .................... 297/344.1 |
| 7,252,320 | B2 * | 8/2007 | Tsujibayashi et al. ..... 296/65.09 |
| 2004/0046408 | A1 * | 3/2004 | Satoh et al. ................ 296/65.09 |
| 2005/0248302 | A1 | 11/2005 | Garland |
| 2006/0066144 | A1 * | 3/2006 | Tsujibayashi et al. ... 297/378.14 |
| 2007/0046074 | A1 | 3/2007 | Satta et al. |

FOREIGN PATENT DOCUMENTS

| DE | 10 2005 053 814 B3 | 6/2007 |
| JP | 2001-347864 A | 12/2001 |
| JP | 2005-053240 A | 3/2005 |
| JP | 2006-082698 A | 3/2006 |
| JP | 2007-069754 A | 3/2007 |

* cited by examiner

*Primary Examiner* — David Dunn
*Assistant Examiner* — Erika Garrett
(74) *Attorney, Agent, or Firm* — Drinker Biddle & Reath LLP

(57) ABSTRACT

A stowable vehicle seat includes a seat support portion that supports a seat cushion rotatably in the front-and-rear direction, a seat back provided with reclining elements that can be folded onto the seat cushion, a stowage recess portion disposed on the vehicle body floor side, a front-side leg portion disposed on the front side of the seat cushion, leg-portion locking elements that lock and unlock the front-side leg portion to and from the vehicle body floor side, a link mechanism connected to the reclining elements and the leg-portion locking elements, and a strap for operating the reclining mechanism and the leg-portion locking elements through the link mechanism, in which the seat back is locked in the folded state in a stowing operation by a pulling operation of the strap.

11 Claims, 12 Drawing Sheets

US 8,534,750 B2

STOWABLE VEHICLE SEAT

CROSS REFERENCE TO RELATED APPLICATIONS

This application is the U.S. national phase of the International Patent Application No. PCT/JP2009/055829 filed Mar. 24, 2009, which claims the benefit of Japanese Patent Application No. 2008-076327 filed Mar. 24, 2008, the entire content of which is incorporated herein by reference.

BACKGROUND

The present invention relates to a stowable vehicle seat and particularly to a stowable vehicle seat that has improved operability.

A stowable vehicle seat has been known, as is a technique in which a front-side leg portion that is lockable and unlockable from a vehicle body floor side is disposed on the front side of a seat cushion forming the stowable vehicle seat and a support portion rotatable in the front-and-rear direction on the front side of a containing recess portion (stowage recess portion) formed in the vehicle body floor is disposed on the rear end portion side thereof, lock of the front-side leg portion is unlocked, and the vehicle seat is rotated rearward and contained in the containing recess portion in a state in which a seat back is folded onto the seat cushion, for example.

That is, the prior-art stowable vehicle seat is, as shown in Japanese Unexamined Patent Application Publication No. 2006-082698 ("the '698 Publication"), configured such that lock of the front-side leg portion to the vehicle body floor side is unlocked by a lever operation and the seat back is folded by a pulling operation of a strap, while the seat cushion is rotated rearward at the same time around rotating shafts disposed on the right and left sides of the rear end portion of the seat cushion so that the vehicle seat is containable in the containing recess portion.

The technique described in the '698 Publication is configured such that reclining lock is unlocked by the pulling operation of the strap, the seat back is folded onto the seat cushion, and the vehicle seat is rotated rearward and operated to be stowed, but since it is configured such that the vehicle seat is rotated rearward with the reclining lock unlocked, a problem might occur in that the folded vehicle seat is opened again during the stowing operation and becomes difficult to be contained.

SUMMARY

In view of the above problems, an object of various embodiments of the present invention is to provide a stowable vehicle seat that is rotated in a stowing direction while the seat back is folded onto the seat cushion during the stowing operation of the stowable vehicle seat to improve operability.

Another object is to provide a stowable vehicle seat that has improved operability while a cost and a weight are reduced.

The above problems are solved by a seat locking device including a first seat support that supports one end portion side of a seat cushion movably in the front-and-rear direction, a seat back that can be folded onto the seat cushion through reclining elements, a second seat support disposed on the other end portion side of the seat cushion, locking and unlocking elements that can lock and unlock the second seat support and the vehicle body floor side, a link mechanism connected to the reclining elements, and an operating element connected to the reclining elements and the locking and unlocking elements through the link mechanism, in which the reclining elements have a reclining mechanism that fold the seat back onto the seat cushion and a detection mechanism that detects a state in which the seat back is folded, and the link mechanism has a first link member connected to the operating element, a second link member connected to the reclining mechanism, and a third link member connected to the detection mechanism.

With the above configuration, during the seat stowing operation, a stowable operation and locking and unlocking operations of the reclining elements can be performed by an operator's operation of the operating element through the first link member and the second link member so that favorable operability of a stowing and returning work of the seat can be ensured.

The second link member is preferably connected to the reclining mechanism and the locking and unlocking elements.

Also, the third link member is preferably provided with a locking member that can lock and unlock the second link member to and from the first link member and is movable upon detection by the detection mechanism of a state in which the seat back is folded to unlock the lock by the locking member.

As described above, since the second link member is connected to the reclining mechanism and the locking and unlocking elements, the third link member is provided with the locking member that can lock and unlock the second link member to and from the first link member and is movable upon detection by the detection mechanism of the state in which the seat back is folded to unlock the lock by the locking member, the stowable moving operation and the locking and unlocking operation of the reclining element and the locking and unlocking elements of the front-side leg portion is performed by the operator's operation of the operating element through the first link member and the second link member, and when the seat back is folded onto the seat cushion, the reclining mechanism is brought into the locking state again so that the seat can be moved, and the seat can be stowed smoothly.

More specifically, the first link member is more preferably supported movably by a pulling operation of the operating element and is urged in a direction opposite to the moving direction by the pulling operation of the operating element all the time.

As described above, according to the above configuration, while the pulling operation of the operating element is not being performed, the first link member is returnable to a predetermined position where it is lockable to the second link member to be reliably operated, and an operating feeling during the stowing operation can be improved.

Also, it is preferable that the second link member is supported coaxially with the first link member, and the third link member is supported by the first link member.

As mentioned above, the above configuration reduces the number of components, cost, and a weight.

It is preferable that the second link member includes a contact portion that can be brought into contact with the locking member of the third link member, a first locking portion connected to the reclining mechanism through a connecting member, a second locking portion connected to the locking and unlocking elements through the connecting member, and a movable shaft supported by the first link member, and the first locking portion and the second locking portion are disposed on both sides of the movable shaft.

As described above, with the above configuration, a component layout is obtained in which a pulling amount that operates the reclining mechanism and the locking and unlocking elements and a movable amount of the second link member is easily adjusted, and reductions in the number of components, cost, and weight are realized.

A stowable vehicle seat is provided in which, during a seat stowing operation, the stowing moving operation by operation of the operating element and the locking and unlocking operation of the reclining element can be performed by one operating element and favorable operability in the stowing and returning operation of the seat is provided.

During the stowing operation of the stowable vehicle seat, since a reclining lock is made in a state in which the seat back is folded onto the seat cushion, a stowable vehicle seat having improved operability is provided.

A stowable vehicle seat is provided that has reliable operations of stowing of and returning of the seat and favorable operation feeling.

The design reduces the number of components, cost and weight.

BRIEF DESCRIPTION OF DRAWINGS

The drawing figures illustrate various embodiments of the invention, that are described in more detail below.

DETAILED DESCRIPTION

An embodiment of the present invention will be described below referring to the attached drawings. Members, arrangement and the like described below do not limit the present invention but it is natural that various variations are possible according to the gist of the present invention.

FIGS. 1 to 12 show an embodiment of the present invention. First, a configuration of a seat S according to this embodiment will be described based on FIGS. 1 to 4.

A vehicle equipped with the seat S according to this embodiment includes three-row seats arranged in series in a longitudinal direction, and seats on the third row are configured stowable. On the rear of the seat S, a stowage recess portion 5 that stows the seat S is disposed on a vehicle body floor 4. A floor carpet, not shown, is laid over substantially the entire surface of the vehicle body floor 4.

The seat S has three seats crosswise and is constituted by a right-side seat S1 for two people located on the right side with respect to a traveling direction of the vehicle and a left-side seat S2 for one person.

In the following explanation, the description of right and left side indicating the direction refers to a direction with respect to the traveling direction of the vehicle.

Also, since a containing mechanism and an operating method are the same for both the right-side seat S1 and the left-side seat S2, the right-side seat S1 will be referred to as the seat S collectively in the following explanation example for convenience.

Figure 1:
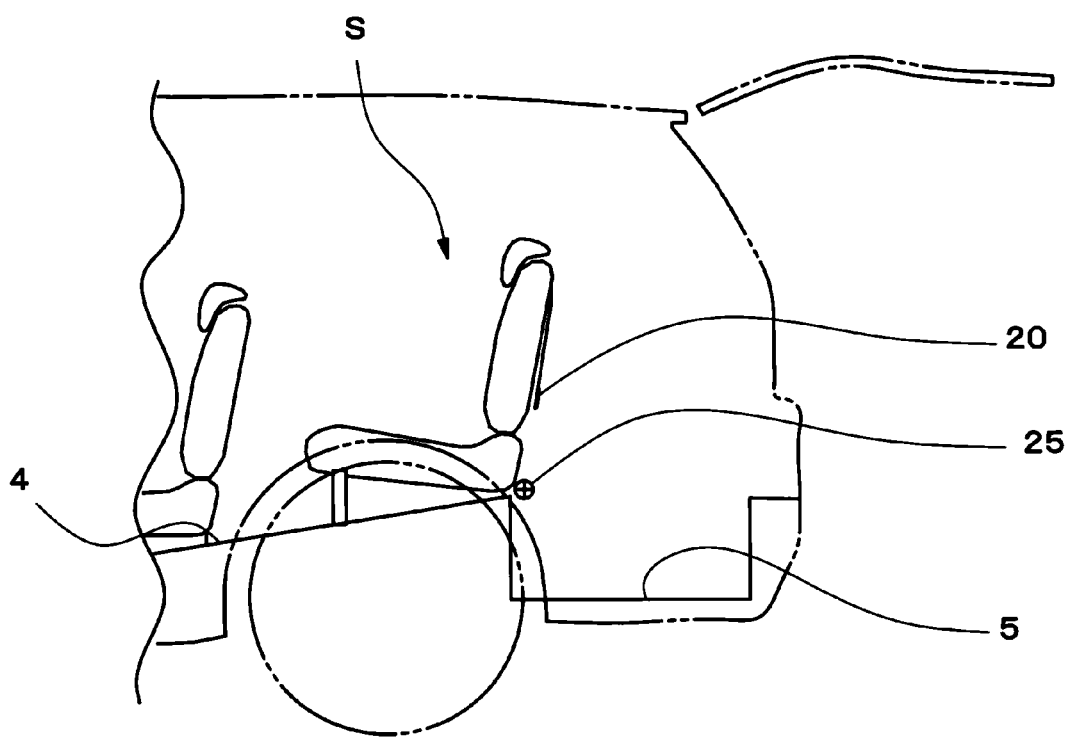
FIG. 1 is a side schematic diagram of a rear portion of a vehicle equipped with a stowable vehicle seat according to an embodiment of the present invention.
Figure 2:
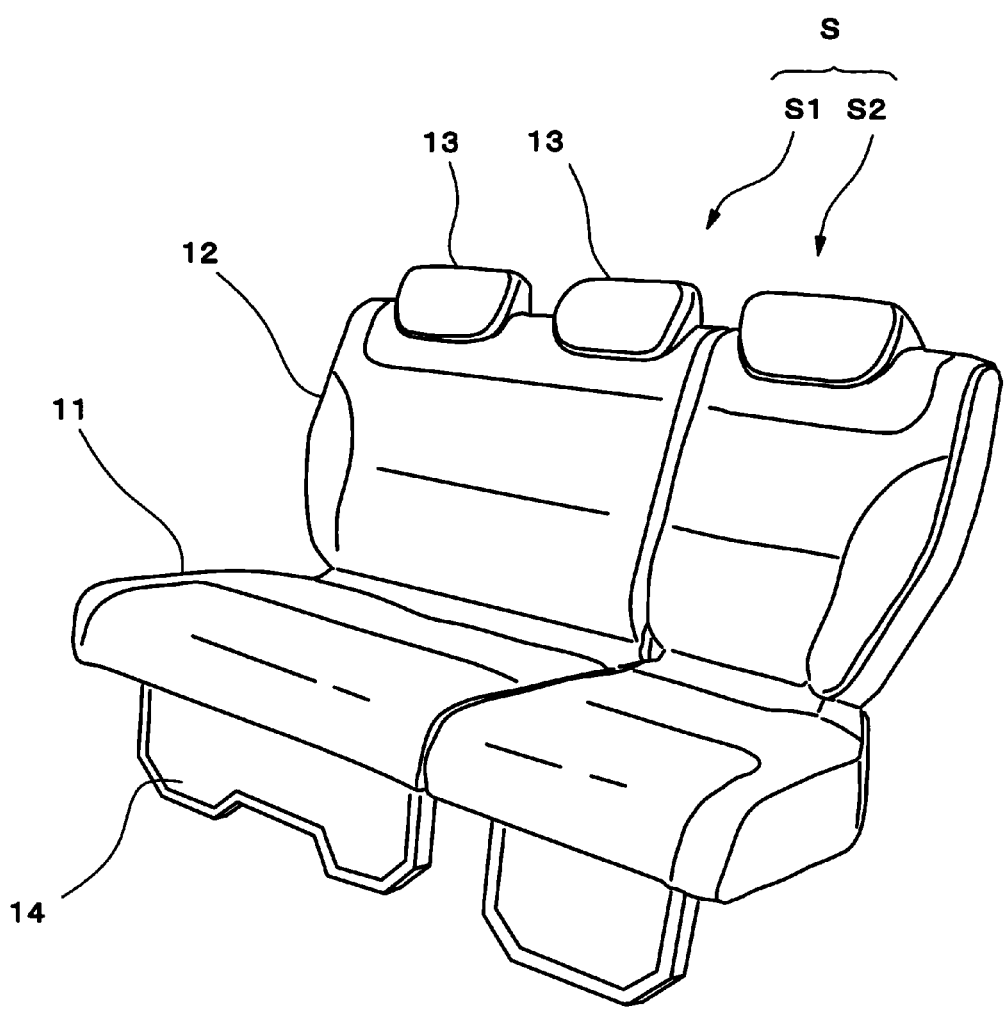
FIG. 2 is a front perspective view of the stowable vehicle seat according to an embodiment of the present invention.
Figure 3:
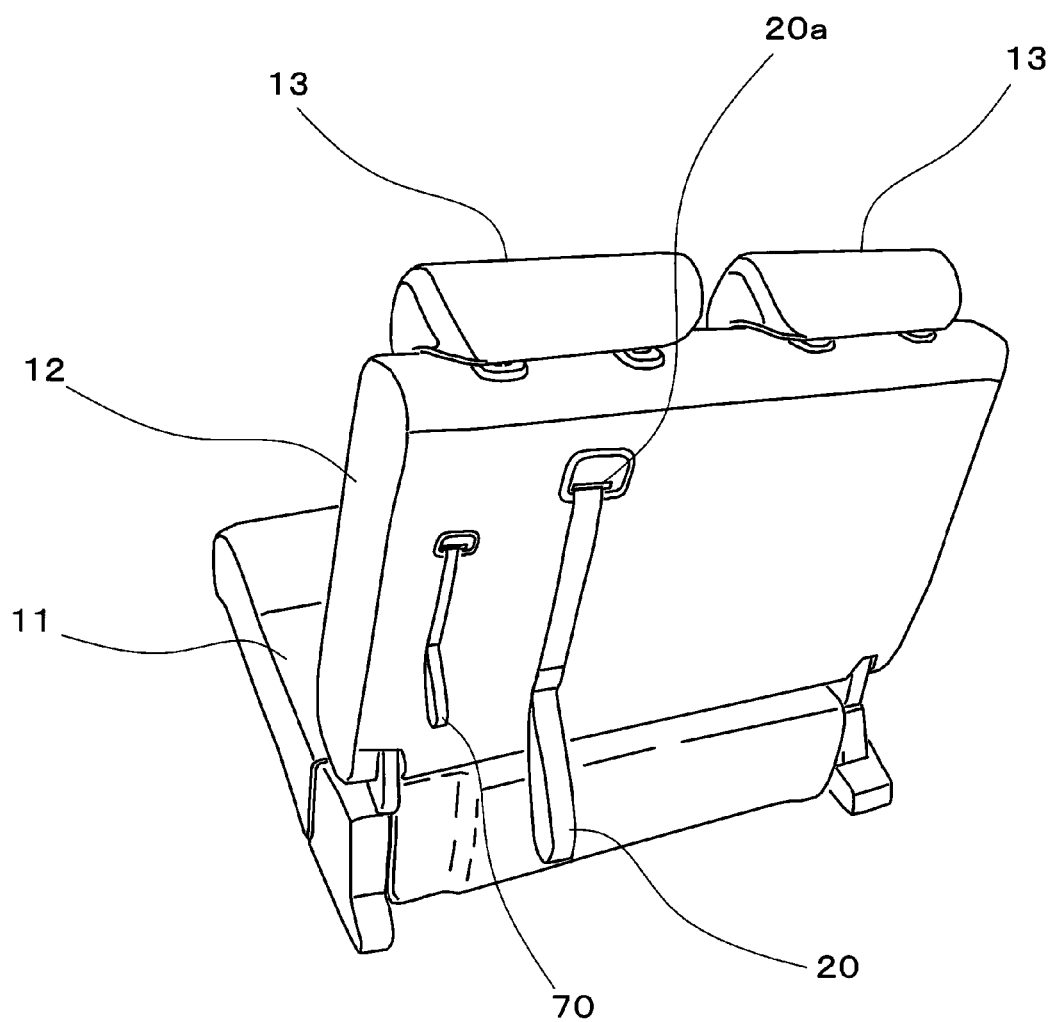
FIG. 3 is a rear perspective view of the stowable vehicle seat according to an embodiment of the present invention.

The seat S includes a seat cushion 11, a seat back 12, headrests 13 and 13, and a front-side leg portion 14. Also, as shown in FIG. 3, from the rear surface side of the seat back 12, a strap 20 as an operating element for performing a stowing operation of the seat S and a return strap 70 for raising and pulling the seat back 12 during a returning operation are extended outward from the rear surface side of the seat S.

The strap 20 is the operating element operated during the stowing and returning operation of the seat S, and a wide bendable belt of a length of approximately 1 m is extended to the outer side from a strap outlet portion 20a to facilitate the operation by a passenger. Since the stowing operation of the seat S is performed by a pulling operation of the strap 20, an operation load is reduced as compared with an operation with a lever. Similarly, the return strap 70 for performing the raising operation of the seat back 12 is also constituted by a wide bendable belt. In a state in which the stowing and returning operations of the seat S are not performed, parts of the strap 20 and the return strap 70 are hooked on the rear surface of the seat back 12 by a planer fastener. In this embodiment, the strap 20 and the return strap 70 are formed as a belt shape, but they may be formed as a strip shape or a pulling-lever shape. If being formed as the pulling-lever shape, it is not exposed like the strap 20 or the return strap 70, and the appearance becomes favorable.

Figure 4:
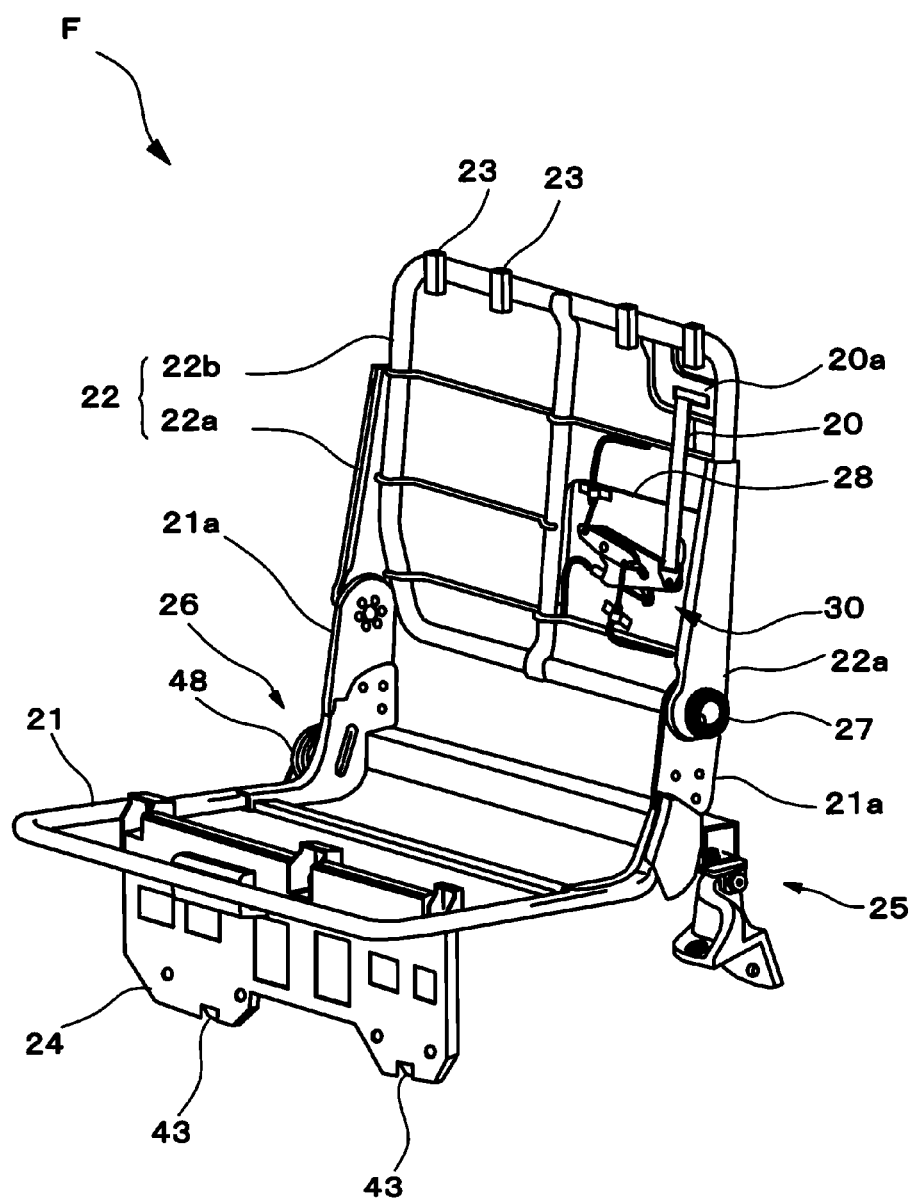
FIG. 4 is an outline perspective view of a seat frame according to an embodiment of the present invention.
Figure 5:
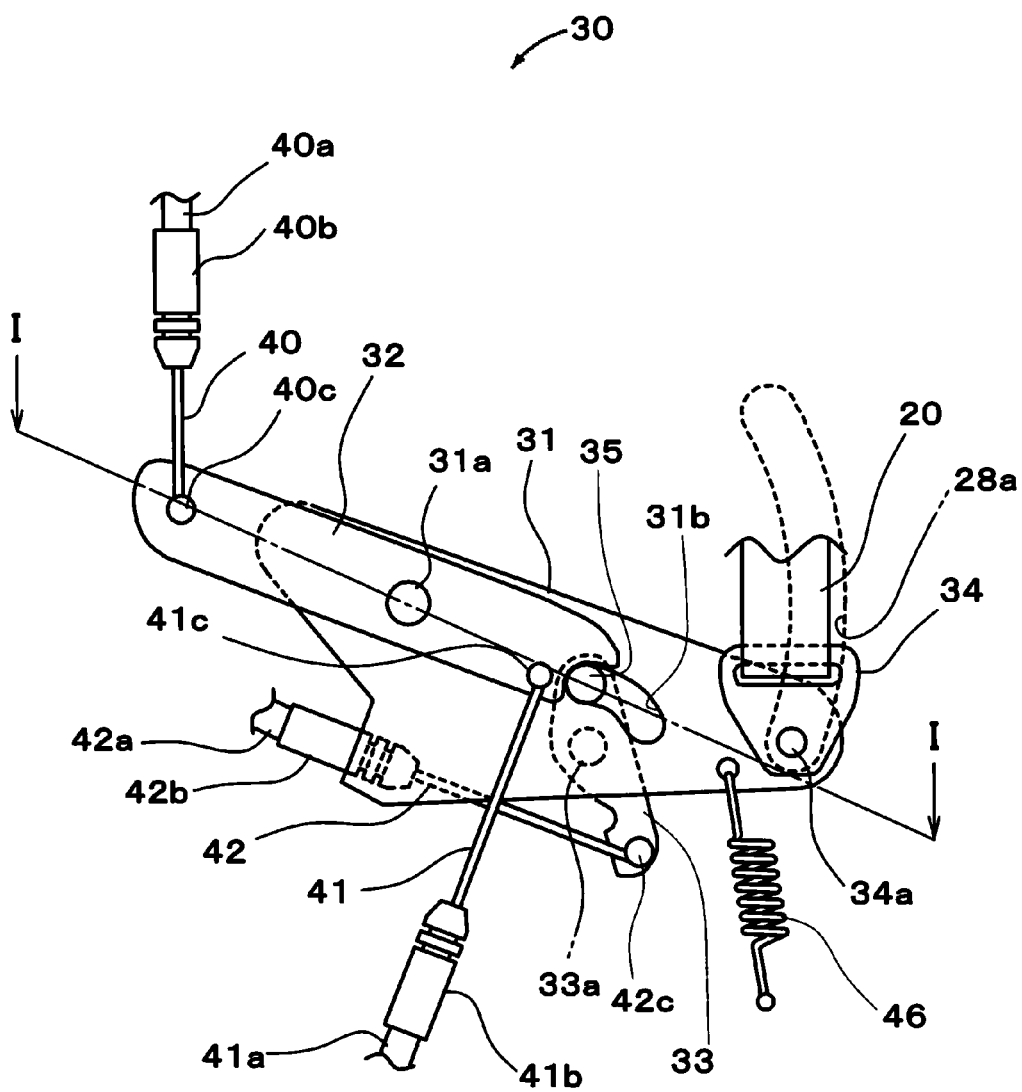
FIG. 5 is an enlarged explanatory side view diagram of a link mechanism according to an embodiment of the present invention.
Figure 6:
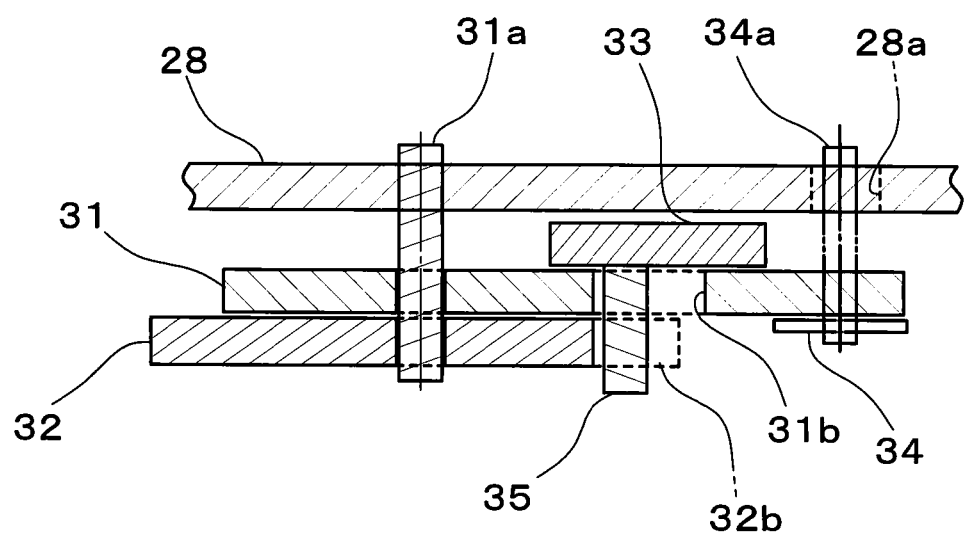
FIG. 6 is a I-I sectional explanatory diagram of the link mechanism according to an embodiment of the present invention.

A seat frame F of the seat S shown in FIG. 4 includes a seat-cushion frame 21 constituting the seat cushion 11, a seat-back frame 22 constituting the seat back 12, and a front-side leg portion frame 24, and the seat-cushion frame 21 and the seat-back frame 22 are connected to each other through a reclining mechanism 27, while the seat-cushion frame 21 and the vehicle body floor 4 side are connected to each other through seat support portions 25 and 26 as a first seat support. Also, above the seat-back frame 22, pillars of the headrest frames, not shown, are disposed through pillar support portions 23.

The seat-cushion frame 21 constitutes the seat cushion 11 which is covered by a cushion pad, cover and the like, not shown, and supports the passenger from below. The seat-cushion frame 21 has the front-side leg portion frame 24 roratably (movably) attached to the front side. Also, at the rear end portion of the seat-cushion frame 21, back frame support portions 21a and 21a to be connected to the seat-back frame 22 are disposed.

The right and left seat support portions 25 and 26 support the rear end portion side of the seat-cushion frame 21 rotatably in the front-and-rear direction, in which a coil spring 48 is attached to the one seat support portion 26 to urge the seat cushion 11 in the front rotating (movable) direction all the time.

The seat-back frame 22 constitutes the seat back 12 that is covered by a cushion pad or the like, not shown, and supports the back of a passenger from behind, and in this embodiment, it is formed by a substantially rectangular frame body. In more detail, the seat back 12 is constituted by side frames 22a and 22a and a center frame 22b. The side frames 22a and 22a are constituted by a right and left pair and formed separately in the crosswise direction of the seat-back frame 22 and extending in the vertical direction. The center frame 22b is formed by a substantially rectangular frame body sandwiched by the side frames 22a and 22a.

The lower end portion sides of the side frames 22a and 22a are connected to the back-frame support portions 21a and 21a through the reclining mechanism 27 as a reclining element.

Inside the center frame 22b, which is a frame body, a back plate 28 in a substantially plate shape is disposed along the surface supporting the back of the passenger, and on the back plate 28, a link mechanism 30, which will be described below, is disposed. Also, the strap outlet portion 20a is disposed on the upper part of the center frame 22b.

The front-side leg portion frame 24 is covered by a cover material, not shown, to constitute the front-side leg portion 14 as a second seat support and supports the front side of the seat-cushion frame 21 and is connected to the vehicle body floor 4 side. The front-side leg portion frame 24 is supported on the front side of the seat-cushion frame 21 at an upper part rotatably in the front-and-rear direction, and at a lower part of the front-side leg portion frame 24, a leg-portion locking mechanism as locking and unlocking elements connected to leg-portion strikers 44 disposed on the vehicle body floor 4 side, being lockable and unlockable, are arranged.

Subsequently, a configuration of the link mechanism 30 will be described referring to FIGS. 5 to 8.

The link mechanism 30 is connected to the strap 20 used in the operation of the seat S and is provided with a function of appropriately unlocking the reclining mechanism 27 and the lock between the front-side leg portion 14 and the vehicle body floor 4 in conjunction with the operation of the strap 20 and the state of the seat S and is formed on the back plate 28 as mentioned above.

The link mechanism 30 includes a first link member 31, a second link member 32, and a third rotatable link member 33 pivotally supported, and a connecting member is connected to each of the link members.

The connecting member includes a reclining release wire 40 connected to the reclining mechanism 27, a leg-portion release wire 41 connected to locking claws 43 and 43 of the front-side leg portion 14, a cancel wire 42 that detects a folded state of the seat back 12, and the strap 20.

The first link member 31 is a substantially inverted triangular member, which is flat in the crosswise direction, having the strap 20 locked to a locking portion 34a disposed on one end portion side through a strap connecting member 34 and rotatably and pivotally supported on the back plate 28 by a shaft portion 31a disposed at the center part of the first link member 31.

Between the shaft portion 31a and the locking portion 34a, an arc-shaped long hole 31b is formed to draw a part of a concentric circle around a shaft portion 33a, which will be described below.

The other end portion side of the strap 20 connected to the first link member 31 through the strap connecting member 34 is extended outward of the seat back 12 from a strap outlet portion 20a disposed on the rear surface of the seat back 12 to be operated by a passenger easily.

The second link member 32 is a substantially rectangular member and is arranged on the first link member 31 and rotatably and pivotally supported by the shaft portion 31a as a movable shaft at the center part coaxially with the first link member 31. On the end portion side closer to the locking portion 34a, a locking recess portion 32b as a contact portion that is brought into contact with a locking projection 35, which will be described below, is formed, and the reclining release wire 40 is locked to a locking portion 40c as a first locking portion formed on the opposite end portion side. Moreover, between the shaft portion 31a and the locking recess portion 32b, a locking portion 41c as a second locking portion to which a leg-portion release wire 41 is locked is formed.

By pivotally supporting the second link member 32 coaxially with the first link member 31, a cost and a weight is reduced. Also, by disposing the locking portion 40c and the locking portion 41c on the both sides of the shaft portion 31a, such component layout is obtained that a pulling amount that operates the reclining mechanism 27 and the leg-portion locking mechanism and a rotation amount of the second link member 32 is easily adjusted, the number of components is reduced, and cost and weight are reduced.

The locking portion 40c and the locking portion 41c may be disposed on one side of the shaft portion 31a.

The other end portion sides of the reclining release wire 40 and the leg-portion release wire 41 locked by the second link member 32 will be described below.

Figure 7:
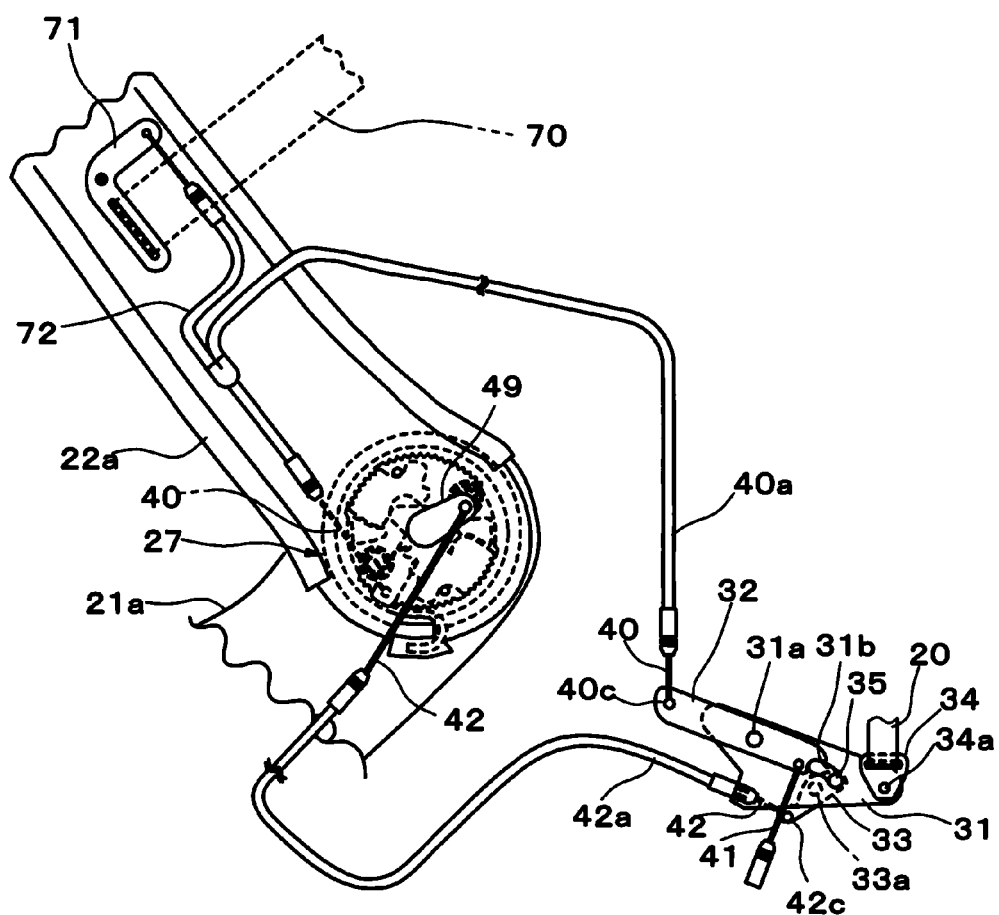
FIG. 7 is an outline explanatory side view diagram of a link mechanism when a seat back is folded according to an embodiment of the present invention.

As shown in FIG. 7, the other end portion side of the reclining release wire 40 locked to the locking portion 40c on the end portion side of the second link member 32 is guided by the reclining release cable 40a and connected to the reclining mechanism 27 that performs a locking and unlocking operation of reclining of the seat back 12.

The reclining mechanism 27 releases the lock state of the reclining mechanism 27 when the reclining release wire 40 is pulled by the operation of the link mechanism 30 to the link mechanism 30 side to make reclining adjustment of the seat back 12 possible.

Figure 8:
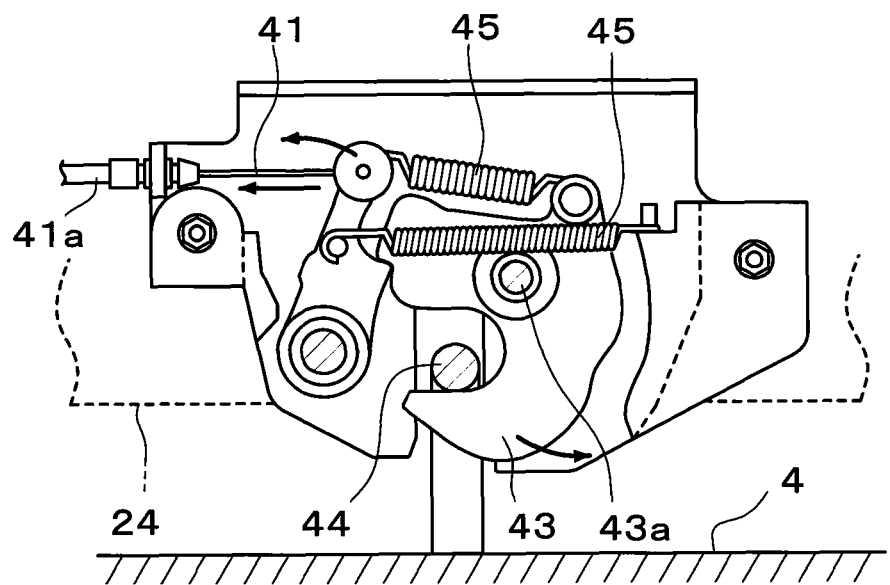
FIG. 8 is an outline explanatory side view diagram of a locking portion of a front-side leg portion according to an embodiment of the present invention.

As shown in FIG. 8, the other end portion side of the leg-portion release wire 41 locked to the locking portion 41c of the second link member 32 is guided by a leg-portion release cable 41a and connected to the leg-portion locking mechanism. The leg-portion locking mechanism is formed at two spots on the lower side of the front-side leg portion 14, but since they share the same configuration, only one of them will be described.

With regard to the leg-portion locking mechanism, when the leg-portion release wire 41 is pulled to the link mechanism 30 side by the operation of the link mechanism 30, the locking claw 43 connected to the leg-portion release wire 41 is rotated around a rotating shaft 43a, the lock with the leg-portion striker 44 on the vehicle body floor 4 side is unlocked, and the seat cushion 11 is brought into a rotatable state in the front-and-rear direction.

The locking claw 43 is urged by an urging spring 45 all the time for rotation in a direction where the lock state to the leg-portion striker 44 is maintained.

The third link member 33 is a substantially rectangular member, arranged between the first link member 31 and the back plate 28, and has the center part pivotally supported by the shaft portion 33a rotabably to the first link member 31 side. In the lower end portion side of the third link member 33, a cancel wire 42 is locked through a locking portion 42c.

On the upper end portion side of the third link member 33, the locking projection 35 as a columnar locking portion is formed, and this locking projection 35 is inserted through the arc-shaped long hole 31b formed in the first link member 31 and brought into contact with the locking recess portion 32b of the second link member 32 and locked so that the second link member 32 is rotated along with the first link member 31.

Here, since the locking projection 35 is formed having an outer diameter slightly smaller than the width of the long hole 31b, while the long hole 31b is formed in an arcuate shape to draw a part of a concentric circle of the shaft portion 33a as mentioned above, it is so configured that the locking projection 35 is moved along the long hole 31b along with the rotation of the third link member 33. Upper and lower limits in a rotation amount of the third link member 33 is adjusted by the length of the long hole 31b.

To the third link member 33, an urging spring, not shown, that urges it in a direction opposite to the direction pulled by the cancel wire 42 all the time is attached. In this case, one end portion of the urging spring is locked to the lower end portion side of the third link member 33, while the opposite end portion is locked to a lower side of the strap locking portion of the first link member 31. By attaching the urging spring to the third link member 33, the operation of the third link member 33 is made more reliable.

The other end portion side of the cancel wire 42 locked by the third link member 33 will be described below.

As shown in FIG. 7, the other end portion side of the cancel wire 42 locked by the locking portion 42c of the third link member 33 is guided by a cancel cable 42a and connected to a locking rib 49 formed on a connection portion between the side frame 22a and the back-frame support portion 21a. The locking rib 49 is a member disposed on the reclining mechanism 27 and mounted to rotate with the side frame 22a. That is, in this embodiment that, the other end portion of the cancel wire 42 is locked to the locking rib 49, and this locking rib 49 is configured as a detection mechanism that pulls the locking portion 42c formed on the third link member 33 through the cancel wire 42 while the seat back 12 is folded.

The reclining element includes this detection mechanism and the reclining mechanism 27.

In this embodiment, the locking rib 49 locked to the other end portion side of the cancel wire 42 is formed on the reclining mechanism 27, but the rib may be formed at other lock positions as long as it is configured such that the cancel wire 42 is operated in a state in which the seat back 12 is folded with respect to the seat cushion 11. Moreover, it may also be formed at a position away from the reclining mechanism 27.

While the third link member 33 is not rotated, since the second link member 32 is rotated along with the first link member 31, the reclining release wire 40 and the leg-portion release wire 41 locked to the second link member 32 is pullable by the pulling operation of the strap 20, and the lock between the reclining mechanism 27 and the leg-portion locking mechanism is thereby unlocked.

If the third link member 33 is rotated, the locking projection 35 secured to the third link member 33 is moved along the long hole 31b. Since it is no longer in contact with the locking projection 35 at the locking recess portion 32b due to the movement of the locking projection 35, the lock between the first link member 31 and the second link member 32 is unlocked.

At this time, by way of the pulling operation of the strap 20, the second link member 32 is not rotated even if the first link member 31 is rotated, and the reclining release wire 40 and the leg-portion release wire 41 locked by the second link member 32 are no longer pulled even if the first link member 31 is rotated.

That is, in the state in which the seat back 12 is folded, the reclining mechanism 27 is kept locked even if the strap 20 is pulled, and even if the stowing operation of the seat S is continued by continuously pulling the strap 20, the folded seat back 12 is not opened again.

The locking portion 34a of the strap connecting member 34 disposed on the first link member 31 pivotally supports the strap connecting member 34 rotatably on the first link member 31 and the other end side thereof is inserted through a guiding hole portion 28a formed in the back plate 28. Since the guiding hole portion 28a is formed in an arcuate shape to draw a part of a concentric circle of the shaft portion 31a, the locking portion 34a can move within the guiding hole portion 28a with rotation of the first link member 31. Also, by adjusting the length of the guiding hole portion 28a, upper and lower limits of a rotation amount of the first link member 31 is settable.

For the second link member 32, too, a projecting-shaped stopper, not shown, is disposed on the back plate 28 or on the first link member 31 to arbitrarily set the upper and lower limits of the rotation amount.

On the reclining release wire 40 and the leg-portion release wire 41 on the end portion side opposite to the link mechanism 30, an urging spring, not shown, that urges each of the reclining release wire 40 and the leg-portion release wire 41 all the time in a direction to maintain the lock state between the reclining mechanism 27 and the leg-portion locking mechanism is disposed.

Also, the first link member 31 is urged by an urging spring 46 in a direction to pull the strap 20 downward all the time. The urging spring 46 has one end portion locked to the lower side of the locking portion 34a and the other end portion to the back plate 28 side. While the pulling operation of the operating element is not performed, the first link member 31 is returned by the urging spring 46 to a predetermined position that is lockable to the second link member 32 so that the link mechanism 30 is reliably operated, and an appropriate operation feeling is given in the pulling operation of the strap 20.

Also, an end portion member 40b, which is an end portion of the reclining release cable 40a that guides the reclining release wire 40 on the link mechanism 30 side is secured to a bracket, not shown, on the back plate 28. Similarly, an end portion member 41b on the link mechanism side that guides the leg-portion release wire 41 is also secured by a bracket, not shown, onto the back plate 28. Also, an end portion member 42b on the link mechanism 30 side that guides the first cancel wire 42 is similarly secured to the first link member 31.

On the seat-back frame 22 to which the reclining mechanism 27 is attached, the return strap 70 that can release the lock of the reclining mechanism 27 and raise the seat back 12 is attached through a return link member 71 (See FIG. 7). The return link member 71 is rotatably attached to the side frame 22a, in which the return strap 70 is locked to one end portion side, while a second reclining release wire 72 that unlocks the reclining mechanism 27 by the pulling operation is locked to the other end portion side. The second reclining release wire 72 is one part of the reclining release wire 40 locked to the reclining mechanism 27 side that is branched into two parts.

Though description will be made below, in the returning operation of the seat S, the seat back 12 is made to raise by pulling the return strap 70 in a state with the seat cushion 11 installed.

In this embodiment, the second reclining release wire 72 is configured as one of the branched parts of the reclining release wire 40, but it may be separately attached to the rib of the reclining mechanism 27.

Subsequently, the stowing and returning operations of the seat S and the operation of the link mechanism 30 according to this embodiment will be described referring to FIGS. 9 to 12.

First, the stowing operation of the seat S will be described referring to FIGS. 9A-E.

Figure 9A:
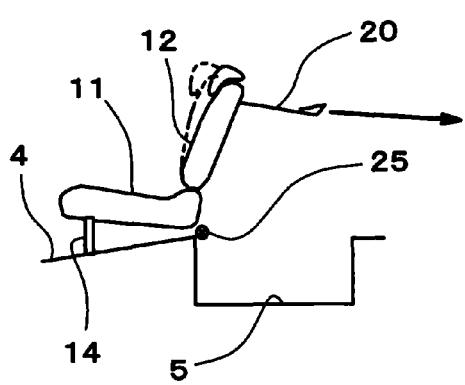
FIGS. 9A-E are explanatory side view diagrams illustrating an operation procedure in a stowing operation of the stowable vehicle seat according to an embodiment of the present invention.

FIG. 9A shows a state in which the strap 20 is pulled rearward in a seat installation state. When the strap 20 is pulled rearward by a passenger, the lock of the reclining mechanism 27 is unlocked.

At this time, the seat back 12 to which the strap 20 is attached is urged to the forward direction by a coil spring, not shown, attached to the reclining mechanism 27. If the strap 20 is pulled against the urging direction, the lock of the locking claws 43 and 43 of the front-side leg portion 14 is unlocked by a stress lower than a stress to fold the seat back 12 down rearward.

Figure 9B:
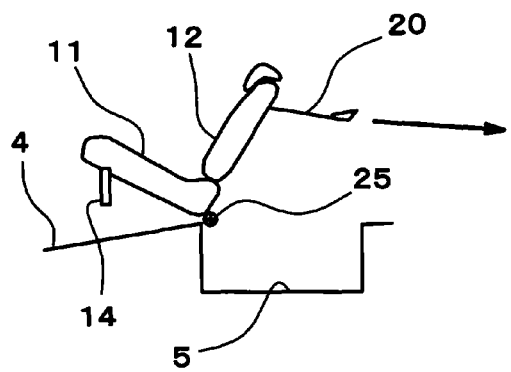

FIG. 9B shows a state in which the lock of the locking claws 43 and 43 of the front-side leg portion 14 is unlocked. That is, the lock of the locking claws 43 and 43 of the front-side leg portion 14 is unlocked, and the seat S is made rotatable rearward.

Figure 9C:
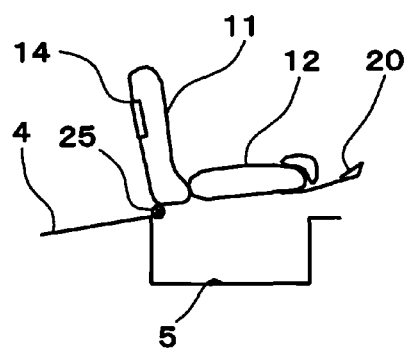
Figure 9D:
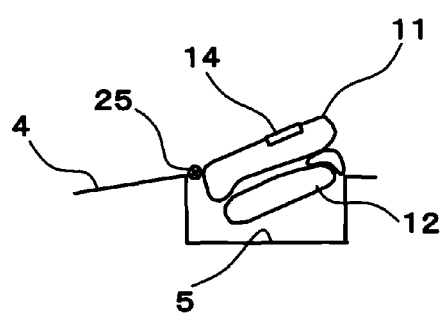

FIGS. 9C and 9D show a state in which the rearward rotation of the seat S progresses. The center of gravity of the seat S exceeds a middle point of rotation and thereafter, the seat S is rotated rearward by its own weight and reaches the stowed state. At this time, if the seat back 12 is brought into a folded state, the reclining mechanism 27 is locked again.

Also, a rearward rotating speed of the seat S is reduced by the coil spring 48 attached to the seat support portion 26 to alleviate an impact generated during the stowage into the stowage recess portion 5.

The front-side leg portion 14 is folded to the seat cushion 11 side by its own weight along with the rotation of the seat S.

Figure 9E:
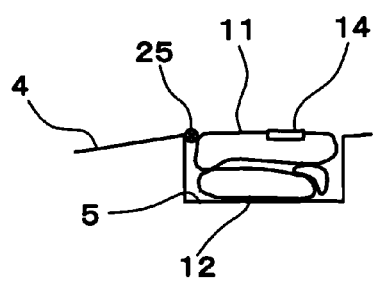

FIG. 9E shows a stowed state of the seat S. In this state, an opening portion of the stowage recess portion 5 forms an integral flat surface with the rear surface of the seat cushion 11, and a large trunk is ensured. In order to suppress rattling of the seat S in the stowed state, a locking mechanism that locks the rear surface of the seat back 12 and the bottom portion of the stowage recess portion 5 that is lockable and unlockable may be disposed.

An operation of the link mechanism 30 during the stowing operation of the above-mentioned seat S will be described according to FIGS. 10A-D.

Figure 10A:
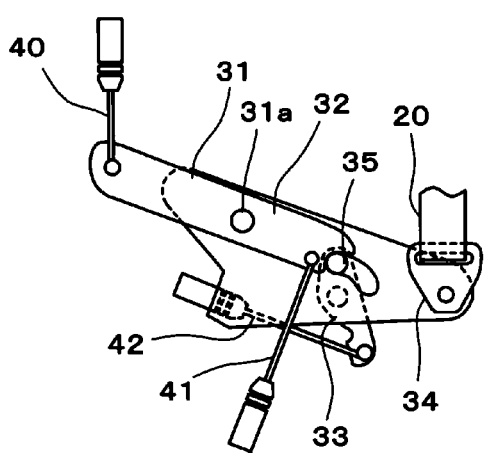
FIGS. 10A-D are operation explanatory side view diagrams of the link mechanism in the stowing operation of the stowable vehicle seat according to an embodiment of the present invention.

FIG. 10A shows a state of the link mechanism 30 in the installed state of the seat S (See FIG. 9A), which is a stage prior to the operation of the strap 20 by the passenger. The state of the link mechanism 30 at this time is referred to as an original position.

Figure 10B:
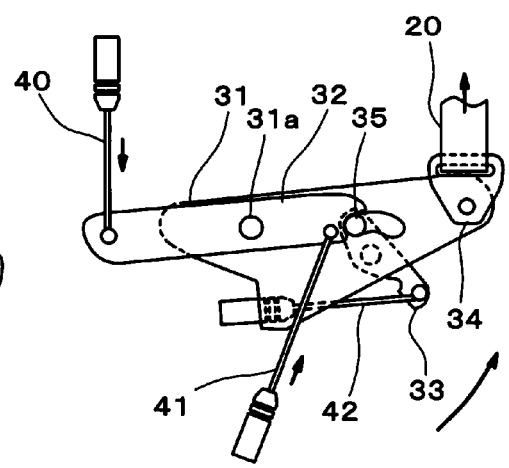

FIG. 10B shows a state of the link mechanism 30 when the lock of the reclining mechanism 27 is unlocked (FIG. 9B), which is a stage when the strap 20 is somewhat pulled rearward. Since the first link member 31 is rotated in the direction pulled by the operation of the strap 20, the reclining release wire 40 is pulled with the rotation, and the lock of the reclining mechanism 27 is unlocked. At this time, since the seat back 12 is in the raising state with respect to the seat cushion 11, the cancel wire 42 is not pulled, the second link member 32 is rotated along with the first link member 31, and the leg-portion release wire 41 is also pulled. However, the lock by the locking claws 43 and 43 connecting the front-side leg portion 14 and the vehicle body floor 4 side is set to not be unlocked by the pulled amount in this state, and the lock of the leg portion is maintained.

Figure 10C:
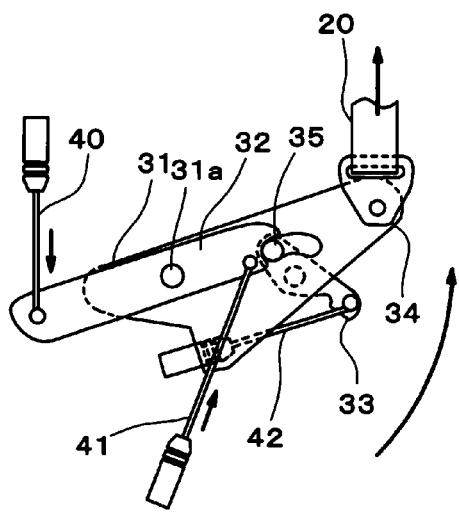

FIG. 10C shows a state (FIG. 9C) of the link mechanism 30 when the lock between the reclining mechanism 27 and the locking claws 43 and 43 of the front-side leg portion 14 is unlocked and a state in which the strap 20 is further pulled. By pulling the strap 20 more strongly than the state (FIG. 9B) in FIG. 10B, the second link member 32 is also rotated largely. The reclining release wire 40 and the leg-portion release wire 41 are further pulled along with this rotation. At this time, the lock of the leg portion is unlocked.

Figure 10D:
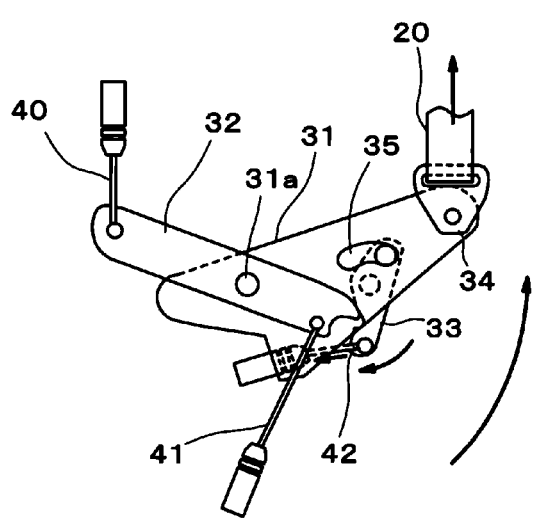

FIG. 10D shows a state of the link mechanism 30 in the final stage of the stowing rotation (FIG. 9D), in which though the strap 20 is being pulled, since the seat back 12 is folded, the third link member 33 is rotated, and the lock between the first link member 31 and the second link member 32 is unlocked. In this state, since the second link member 32 is rotated with respect to the first link member 31, the reclining release wire 40 and the leg-portion release wire 41 are not pulled, and the reclining mechanism 27 and the leg-portion locking mechanism are locked. However, since it is already located far from the striker 44, even if the leg-portion locking mechanism is locked, the stowing operation of the seat S is not affected.

Also, by stopping the operation of the strap 20 after the seat S has been stowed, though the first link member 31 is returned by the urging spring 46 to the position before the rotation, since the seat back 12 is stowed in the folded state with respect to the seat cushion 11 (See FIG. 9E), the cancel wire 42 is pulled and the third link member 33 is held in the rotated state.

Subsequently, the returning operation of the seat S will be described according to FIGS. 11A-E.

Figure 11A:
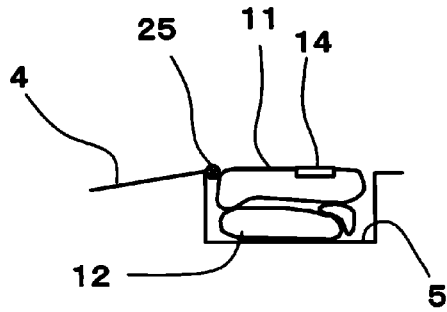
FIGS. 11A-E are explanatory side view diagrams illustrating an operation procedure in a returning operation of the stowable vehicle seat according to an embodiment of the present invention.

FIG. 11A shows a state in which the seat S is stowed. By pulling up a grip, not shown, disposed on the rear surface side of the seat cushion 11, the seat S is rotated and operated in the returning rotating direction.

Figure 11B:
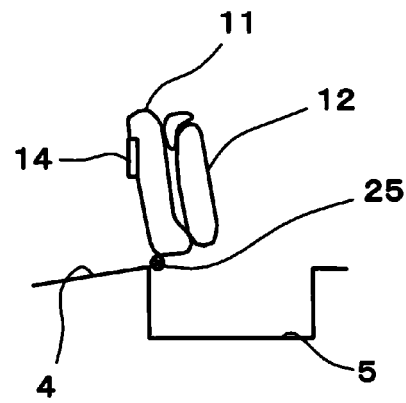

FIG. 11B shows a state of the returning rotation of the seat S. The operation load is reduced due to being urged by the coil spring 48 attached to the seat support portion 26 in the returning rotating direction.

Along with the forward rotation of the seat S, the front-side leg portion 14 is rotated and extended downward by its own weight.

Figure 11C:
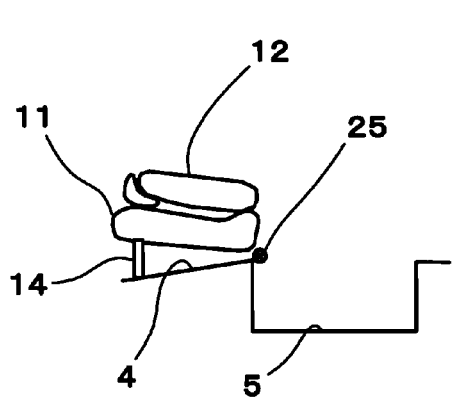

FIG. 11C shows a state in which the locking claws 43 and 43 of the front-side leg portion 14 of the seat S are locked to the vehicle body floor 4 side. The locking claws 43 and 43 are locked to the leg-portion striker 44 on the vehicle body floor 4 side by a pressure of the weight of the seat S.

Figure 11D:
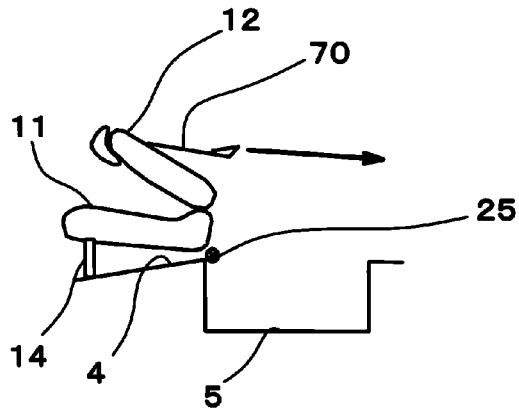

FIG. 11D shows an operation to pull the return strap 70 rearward from the state in which the locking claws 43 and 43 of the front-side leg portion 14 of the seat S are locked to the leg-portion striker 44 on the vehicle body floor 4 side.

Figure 11E:
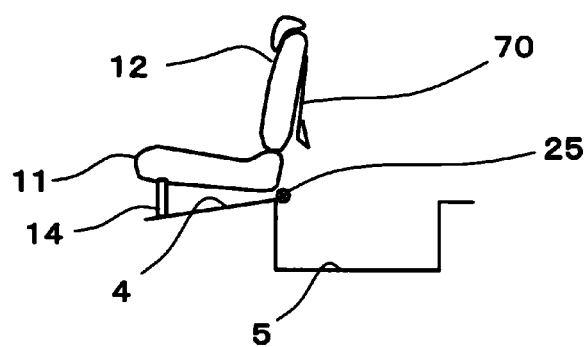

FIG. 11E shows a state in which the returning operation of the seat S is completed.

That is, the passenger can return the seat S only through the operation to pull the return strap 70 rearward after gripping the grip of the seat cushion 11 in the state in which the seat back 12 is folded and stowed and rotating it forward.

The operation of the link mechanism 30 during the above-mentioned returning operation of the seat S will be described according to FIGS. 11A-12B.

Figure 12A:
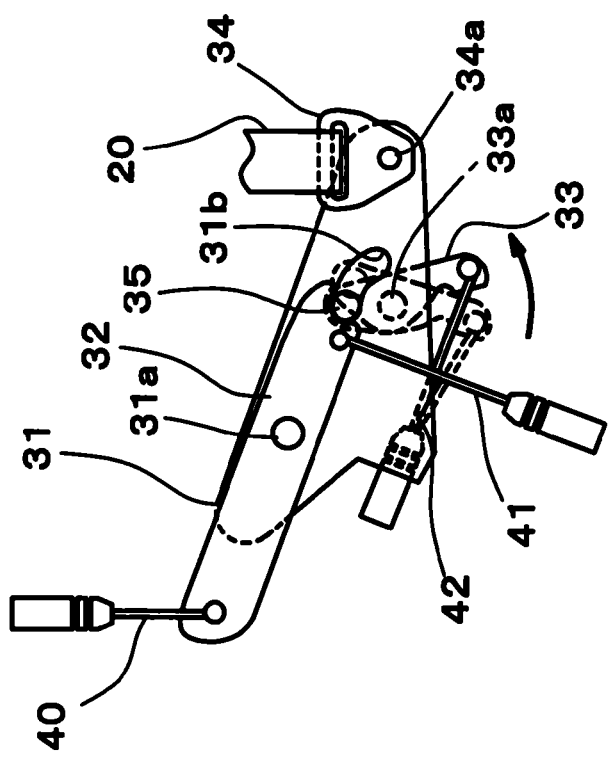
FIGS. 12A, B are an operation explanatory side view diagrams of the link mechanism in the returning operation of the stowable vehicle seat according to an embodiment of the present invention.

FIG. 12A shows a state of the link mechanism 30 from the stowed state (FIG. 11A) of the seat S to a stage (FIG. 11C) in which the seat S is rotated and the locking claws 43 and 43 are locked to the vehicle body floor 4 side. This is the state before the return strap 70 is operated by the passenger, and since it is in the state in which the seat back 12 is folded, the cancel wire 42 is pulled, and the third link member 33 is held in the rotated state.

Figure 12B:
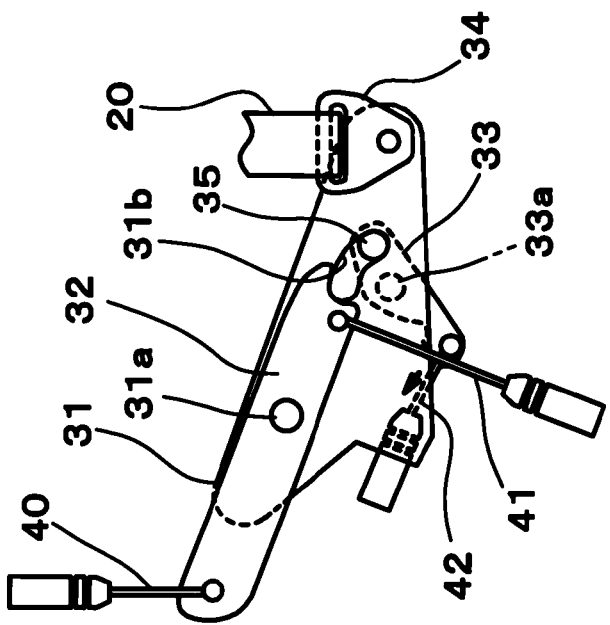

FIG. 12B shows a stage (FIG. 11D) in which the return strap 70 is somewhat pulled rearward in order to raise the seat back 12. By way of the operation of the return strap 70, the seat back 12 is made to raise. The raising operation of the seat back 12 by the return strap 70 is performable regardless of the state of the link mechanism 30. By raising of the seat back 12, the cancel wire 41 is returned to the state in which the wire is not pulled, the third link member 33 is returned to a lockable position of the second link member 32.

Depending on the operation of the return strap 70, the leg-portion release wire 41 is not pulled, and the lock state of the locking claws 43 and 43 is maintained.

At this time, since the pulling operation of the strap 20 is not performed and the second link member 32 is at the original position, the second link member 32 is locked by the third link member 33 to the first link member 31, each link member of the link mechanism 30 is returned to the state at the original position (See FIG. 10A).

As mentioned above, according to the seat S described herein, during the stowing operation, the stowing rotation operation and the locking and unlocking operation of the reclining mechanism 27 is performable only by the pulling operation of the strap 20, and favorable operability during the stowing and returning operation of the seat is obtained.

Also, in the stowing operation of the seat S, since the reclining mechanism 27 is locked in the state in which the seat back 12 is folded onto the seat cushion 11, there is no risk that the seat back 12 is opened again during the stowage rotation and brought into contact with the edge of the stowage recess portion 5 is eliminated, and operability is improved.

In this embodiment, the third-row seat divided into right and left of an automobile was described as a specific example, but not limited to that, it is natural that the similar configuration can also be applied to a long integrally-formed bench-type seat, a passenger's seat or the other rear seats.

Also, in this embodiment, the stowable vehicle seat S in which the operating element in stowage is integrated into the strap 20 was described, but the present invention can be also applied to a seat having a strap and a lever as the operating element in stowage.

TABLE OF REFERENCE CHARACTERS

S seat
F seat frame
S1 right-side seat
S2 left-side side
4 vehicle body floor
5 stowage recess portion
11 seat cushion
12 seat back
13 headrest
14 front-side leg portion
20 strap
20a strap outlet portion
21 seat-cushion frame
21a back-frame support portion
22 seat-back frame
22a side frame
22b center frame
23 pillar support portion
24 front-side leg portion frame
25, 26 seat support portion
27 reclining mechanism
28 back plate
28a guiding hole portion
30 link mechanism
31 first link member
31a, 33a shaft portion
31b long hole
32 second link member
32b locking recess portion
33 third link member
34 strap connecting member
34a, 40c, 41c, locking portion
42c
35 locking projection
40 reclining release wire
40a reclining release cable
40b, 41b, 42b end-portion member
41 leg-portion release wire
41a leg-portion release cable
42 cancel wire
42a cancel cable
43 locking claw
43a rotating shaft
44 leg-portion striker
45, 46 urging spring
48 coil spring
49 locking rib
70 return strap
71 return link member
72 second reclining release wire

The invention claimed is:

1. A stowable vehicle seat comprising:
a first seat support that supports one end portion side of a seat cushion movably in a front-and-rear direction;
a seat back that is foldable onto said seat cushion through reclining elements;
a second seat support disposed on an other end portion side of said seat cushion;
locking and unlocking elements that lock and unlock said second seat support and the vehicle body floor side;
a link mechanism connected to said reclining elements; and
operating element connected to said reclining elements and said locking and unlocking elements through said link mechanism, wherein
said reclining elements has a reclining mechanism that folds said seat back onto said seat cushion and a detection mechanism that detects a state in which said seat back is folded; and
said link mechanism has a first link member connected to said operating element, a second link member connected to said reclining mechanism, and a third link member connected to said detection mechanism;
wherein:
the stowable vehicle seat further comprises a detection mechanism connecting member that connects said third link member to said detection mechanism; and
said detection mechanism connecting member is pulled by said detection mechanism when said detection mechanism detects a state in which said seat back is folded and thereby said third link member is moved.

2. The stowable vehicle seat according to claim 1, wherein said second link member is connected to said reclining mechanism and the locking and unlocking elements.

3. The stowable vehicle seat according to claim 1, wherein said third link member is provided with a locking member that locks and unlocks said second link member to and from said first link member and moved upon detection by said detection mechanism of a state in which said seat back is folded to unlock the lock by said locking member.

4. The stowable vehicle seat according to claim 1, wherein said first link member is supported movably by a pulling operation of said operating element and is urged in a direction opposite to the moving direction by the pulling operation of said operating element all the time.

5. The stowable vehicle seat according to claim 1, wherein said second link member is supported coaxially with said first link member, and said third link member is supported by said first link member.

6. The stowable vehicle seat according to claim 1, wherein said second link member includes a contact portion that is brought into contact with said locking member of said third link member, a first locking portion connected to said reclining mechanism through a first connecting member, a second locking portion connected to said locking and unlocking elements through a second connecting member, and a movable shaft supported by said first link member; and
said first locking portion and said second locking portion are disposed on both sides of said movable shaft.

7. The stowable vehicle seat according to claim 1, further comprising:
a locking and unlocking element connecting member that comprises a wire member and connects said second link member to said locking and unlocking elements and;
wherein said second link member is directly connected to said locking and unlocking element connecting member.

8. A stowable vehicle seat comprising:
a first seat support that supports one end portion side of a seat cushion movably in a front-and-rear direction;
a seat back that is foldable onto said seat cushion through reclining elements;
a second seat support disposed on an other end portion side of said seat cushion;
locking and unlocking elements that lock and unlock said second seat support and the vehicle body floor side;
a link mechanism connected to said reclining elements; and
operating element connected to said reclining elements and said locking and unlocking elements through said link mechanism, wherein
said reclining elements has a reclining mechanism that folds said seat back onto said seat cushion and a detection mechanism that detects a state in which said seat back is folded; and
said link mechanism has a first link member connected to said operating element, a second link member connected to said reclining mechanism, and a third link member connected to said detection mechanism;
wherein said third link member is provided with a locking member that locks and unlocks said second link member to and from said first link member and moved upon detection by said detection mechanism of a state in which said seat back is folded to unlock the lock by said locking member.

9. A stowable vehicle seat comprising:
a first seat support that supports one end portion side of a seat cushion movably in a front-and-rear direction;
a seat back that is foldable onto said seat cushion through reclining elements;
a second seat support disposed on an other end portion side of said seat cushion;
locking and unlocking elements that lock and unlock said second seat support and the vehicle body floor side;
a link mechanism connected to said reclining elements; and
operating element connected to said reclining elements and said locking and unlocking elements through said link mechanism, wherein
said reclining elements has a reclining mechanism that folds said seat back onto said seat cushion and a detection mechanism that detects a state in which said seat back is folded; and
said link mechanism has a first link member connected to said operating element, a second link member connected to said reclining mechanism, and a third link member connected to said detection mechanism;
wherein said first link member is supported movably by a pulling operation of said operating element and is urged in a direction opposite to the moving direction by the pulling operation of said operating element all the time.

10. A stowable vehicle seat comprising:
a first seat support that supports one end portion side of a seat cushion movably in a front-and-rear direction;
a seat back that is foldable onto said seat cushion through reclining elements;
a second seat support disposed on an other end portion side of said seat cushion;
locking and unlocking elements that lock and unlock said second seat support and the vehicle body floor side;
a link mechanism connected to said reclining elements; and
operating element connected to said reclining elements and said locking and unlocking elements through said link mechanism, wherein
said reclining elements has a reclining mechanism that folds said seat back onto said seat cushion and a detection mechanism that detects a state in which said seat back is folded; and
said link mechanism has a first link member connected to said operating element, a second link member connected to said reclining mechanism, and a third link member connected to said detection mechanism;
wherein said second link member is supported coaxially with said first link member, and said third link member is supported by said first link member.

11. A stowable vehicle seat comprising:
a first seat support that supports one end portion side of a seat cushion movably in a front-and-rear direction;
a seat back that is foldable onto said seat cushion through reclining elements;
a second seat support disposed on an other end portion side of said seat cushion;
locking and unlocking elements that lock and unlock said second seat support and the vehicle body floor side;
a link mechanism connected to said reclining elements; and
operating element connected to said reclining elements and said locking and unlocking elements through said link mechanism, wherein said reclining elements has a reclining mechanism that folds said seat back onto said seat cushion and a detection mechanism that detects a state in which said seat back is folded; and said link mechanism has a first link member connected to said operating element, a second link member connected to said reclining mechanism, and a third link member connected to said detection mechanism;

wherein:

said second link member includes a contact portion that is brought into contact with said locking member of said third link member, a first locking portion connected to said reclining mechanism through a first connecting member, a second locking portion connected to said locking and unlocking elements through a second connecting member, and a movable shaft supported by said first link member; and said first locking portion and said second locking portion are disposed on both sides of said movable shaft.

* * * * *